US010959137B2

(12) United States Patent
Yanover et al.

(10) Patent No.: US 10,959,137 B2
(45) Date of Patent: Mar. 23, 2021

(54) PROCEDURES FOR INTERACTION BETWEEN THE RADIO CONTROLLER AND THE SUBORDINATED BASE STATION

(71) Applicant: Cisco Technology, Inc., San Jose, CA (US)

(72) Inventors: Vladimir Yanover, Kfar-Saba (IL); Alon Ben Ami, Gedera (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/358,831

(22) Filed: Mar. 20, 2019

(65) Prior Publication Data
US 2020/0260344 A1 Aug. 13, 2020

Related U.S. Application Data

(60) Provisional application No. 62/802,299, filed on Feb. 7, 2019.

(51) Int. Cl.
*H04W 36/00* (2009.01)
*H04W 24/10* (2009.01)
*H04W 88/12* (2009.01)

(52) U.S. Cl.
CPC ....... *H04W 36/0066* (2013.01); *H04W 24/10* (2013.01); *H04W 36/0033* (2013.01); *H04W 36/00837* (2018.08); *H04W 88/12* (2013.01)

(58) Field of Classification Search
None
See application file for complete search history.

(56) References Cited

U.S. PATENT DOCUMENTS 8,903,373 B1 12/2014 Nuss et al.
10,143,002 B2 11/2018 Madan et al.
(Continued)

FOREIGN PATENT DOCUMENTS

EP 1395068 A1 * 3/2004 ............ H04W 48/18

OTHER PUBLICATIONS

Klaine, Paulo Valente, et al. "A Survey of Machine Learning Techniques Applied to Self-Organizing Cellular Networks." IEEE Communications Surveys & Tutorials, vol. 19, Issue 4, Jul. 2017, 41 pages.
(Continued)

*Primary Examiner* — Ayaz R Sheikh
*Assistant Examiner* — Tarell A Hampton
(74) *Attorney, Agent, or Firm* — Edell, Shapiro & Finnan, LLC

(57) ABSTRACT

A radio controller entity is in communication with a centralized control plane entity of a disaggregated base station, or with a monolithic base station, the disaggregated base station or monolithic base station serving wireless user equipment in a wireless network. The radio controller entity obtains from the centralized control plane entity or from the monolithic base station, a context associated with one or more user equipment served by the disaggregated base station or the monolithic base station. The radio controller entity determines a policy to be set. The policy defines a set of one or more rules, each rule including a condition and an action. The rule may include that the base station should query the radio controller for an instruction as to which action(s) to apply. The radio controller entity provides the policy to the centralized control plane entity or to the monolithic base station.

20 Claims, 6 Drawing Sheets

(56) References Cited

U.S. PATENT DOCUMENTS

| | | | | |
|---|---|---|---|---|
| 2006/0133331 | A1* | 6/2006 | Jhamnani | H04W 72/1268 370/338 |
| 2007/0094322 | A1* | 4/2007 | Peev | H04L 67/34 709/202 |
| 2009/0285099 | A1* | 11/2009 | Kahn | H04L 47/30 370/236 |
| 2011/0096732 | A1* | 4/2011 | Rashid | H04L 47/14 370/329 |
| 2012/0039175 | A1 | 2/2012 | Sridhar et al. | |
| 2013/0155849 | A1* | 6/2013 | Koodli | H04L 47/808 370/230 |
| 2013/0155965 | A1* | 6/2013 | Koodli | H04W 4/021 370/329 |
| 2015/0208335 | A1* | 7/2015 | Vrbaski | H04W 48/18 455/426.1 |
| 2015/0334754 | A1* | 11/2015 | Lei | H04W 76/27 455/422.1 |
| 2018/0006891 | A1 | 1/2018 | Zhang | |
| 2019/0059027 | A1* | 2/2019 | Yang | H04W 36/0083 |
| 2019/0098624 | A1* | 3/2019 | Vaidya | H04W 36/38 |
| 2019/0182211 | A1* | 6/2019 | Yang | H04L 61/2592 |
| 2020/0029199 | A1* | 1/2020 | Sen | H04L 41/0806 |
| 2020/0053531 | A1* | 2/2020 | Myhre | H04W 48/18 |
| 2020/0092733 | A1* | 3/2020 | Myhre | H04W 88/085 |
| 2020/0106536 | A1* | 4/2020 | Bedekar | H04L 5/0048 |

OTHER PUBLICATIONS

Cisco, "Cisco SONFlex", White paper Cisco public, Aug. 2018, 7 pages.

NGMN Alliance, "5G Network and Service Management including Orchestration", Version 3.14.0, Mar. 12, 2019, 53 pages.

Yuan, Yannan, "From C-RAN to O-RAN" China Mobile Research Institute, Jun. 21, 2018, Beijing, China, 8 pages.

NGMN Alliance, "NGMN Overview on 5G RAN Functional Decomposition", Feb. 24, 2018, 48 pages.

Amdocs et al., "Use Case—ONAP Support for 5G Wireless Network", 5G Network Deployment, Slicing, Optimization and Automation, Aug. 16, 2017, 17 pages.

Chia-Yu Chang et al., "Slice Orchestration for Multi-Service Disaggregated Ultra-Dense RANs", Orchestration of Ultra-Dense 5G Networks, Digital Object Identifier: 10.1109/MCOM.2018.1701044, IEEE Communications Magazine, Aug. 2018, 8 pages.

Nikolaos Gkatzios et al., "Compute Resource Disaggregation: An Enabler for Efficient 5G RAN Softwarisation", 2018 European Conference on Networks and Communications (EuCNC), Jun. 18-21, 2018, 5 pages.

Converge Network Digest, "Interview—Disaggregating and Virtualizing the RAN", https://www.convergedigest.com/2018/05/interview-disaggregating-and.html, May 13, 2018, 6 pages.

O-RAN Alliance, "O-RAN: Towards an Open and Smart RAN", White Paper, Oct. 2018, 19 pages.

XRAN, "XRAN Southbound Specification v5", XRAN Southbound Working Group, Southbound Interface Specification, Request for Comments, Nov. 2017, 42 pages.

International Search Report and Written Opinion in counterpart International Application No. PCT/US2020/016018, dated May 4, 2020, 15 pages.

\* cited by examiner

400

```
┌─────────────────────────────────────────┐
│ OBTAINING FROM A CENTRALIZED CONTROL PLANE │ 410
│ ENTITY OR FROM A MONOLITHIC BASE STATION, A │
│ CONTEXT ASSOCIATED WITH ONE OR MORE USER  │
│ EQUIPMENT SERVED BY THE DISAGGREGATED BASE │
│ STATION OR THE MONOLITHIC BASE STATION    │
└─────────────────────────────────────────┘
                    │
                    ▼
┌─────────────────────────────────────────┐
│ DETERMINING A POLICY TO BE SET, THE POLICY │ 420
│ DEFINING A SET OF ONE OR MORE RULES, EACH │
│ RULE INCLUDING A CONDITION AND AN ACTION  │
└─────────────────────────────────────────┘
                    │
                    ▼
┌─────────────────────────────────────────┐
│ PROVIDING THE POLICY TO THE CENTRALIZED   │ 430
│ CONTROL PLANE ENTITY OR TO THE MONOLITHIC │
│ BASE STATION                              │
└─────────────────────────────────────────┘
```

FIG.5

PROCEDURES FOR INTERACTION BETWEEN THE RADIO CONTROLLER AND THE SUBORDINATED BASE STATION

PRIORITY CLAIM

This application claims priority to U.S. Provisional Application No. 62/802,299, filed Feb. 7, 2019, entitled "Procedures for Interaction between the Radio Controller and the Subordinated Base Station," the entirety of which is incorporated herein by reference.

TECHNICAL FIELD

The present disclosure relates to mobile wireless network equipment and services.

BACKGROUND

A centralized (disaggregated) Radio Access Network (RAN) architecture involves the split of the Base Station (BS) into a Central Unit (CU) and one or several Distributed Units (DUs). Standardization of the interface between the CU and the DU allows for implementation of the components of these two types by different vendors, which is widely considered the way to reduce RAN cost of ownership. Further disaggregation of the RAN base station may include separation of the entity that makes intelligent decisions, from the rest of the base station or, in case of disaggregated RAN, the CU-CP, which is the Control Plane part of the CU. In this disclosure, the entity that makes such intelligent decisions is called "radio controller"

BRIEF DESCRIPTION OF THE DRAWINGS

FIG. 5 is a flow chart depicting a method according to an example embodiment.

DESCRIPTION OF EXAMPLE EMBODIMENTS

Overview

Presented herein are a system and method in which a radio controller entity is in communication with a centralized control plane entity of a disaggregated base station, or with a monolithic base station, the disaggregated base station or monolithic base station serving wireless user equipment in a wireless network. The radio controller entity obtains from the centralized control plane entity or from the monolithic base station, a context associated with one or more user equipment served by the disaggregated base station or the monolithic base station. The radio controller entity determines a policy to be set, which determination may be based on the context. The policy defines a set of one or more rules, each rule including a condition in terms of the context and an action. The radio controller entity provides the policy to the centralized control plane entity or to the monolithic base station.

EXAMPLE EMBODIMENTS

Figure 1:
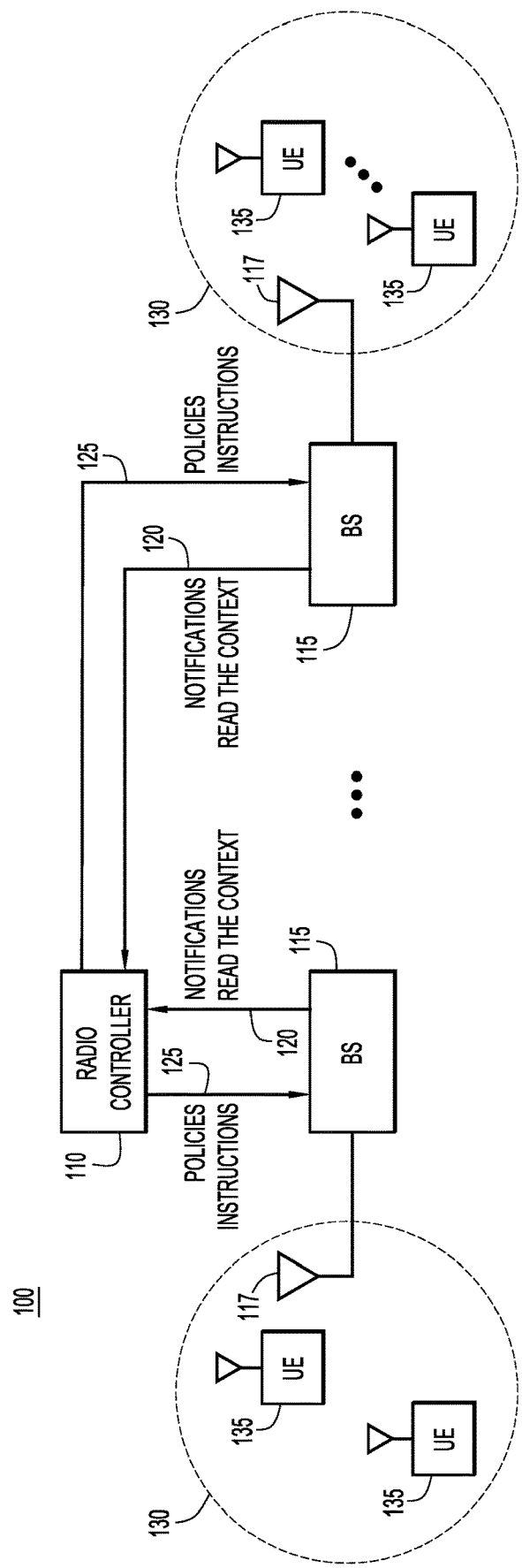
FIG. 1 is a block diagram of a system depicting an interaction between a radio controller and a subordinated base station, according to one example embodiment.

Referring first to FIG. 1, a diagram is shown of a system 100 having a Radio Access Network (RAN) architecture, according to one embodiment. The system 100 includes a radio controller 110 that is in communication with a monolithic base station (BS) 115. The radio controller 110 is a software function or service that can run on a server or other computing entity remote from the BS 115. In another form, the radio controller software may run on the same (computing) platform as that on which the BS software runs. In fact, the radio controller 110 may control multiple monolithic BS's 115, as shown in FIG. 1. In the embodiment of FIG. 1, the monolithic BS 115 includes hardware and/or software to perform baseband signal processing (such as modulation/demodulation) as well as hardware for signal transmission and signal reception via antenna 117.

The radio controller 110 can read contexts from the monolithic BS 115 at any time and receive notifications as well, as shown at 120. Based on the notifications and contexts, the radio controller 110 provides policies and instructions to the monolithic BS 115, as shown at 125. The interactions between the radio controller 110 and the monolithic BS 115 are described in further detail hereinafter. Each monolithic BS 115 serves wireless communication in a corresponding cell 130 with wireless User Equipment (UEs) 135.

One enhancement to a RAN architecture such as that shown in FIG. 1, is to split the monolithic BS 115 into components that can be developed by different vendors. Still another enhancement is to enable real-time control over the actions performed on individual UEs or group of UEs.

Figure 2:
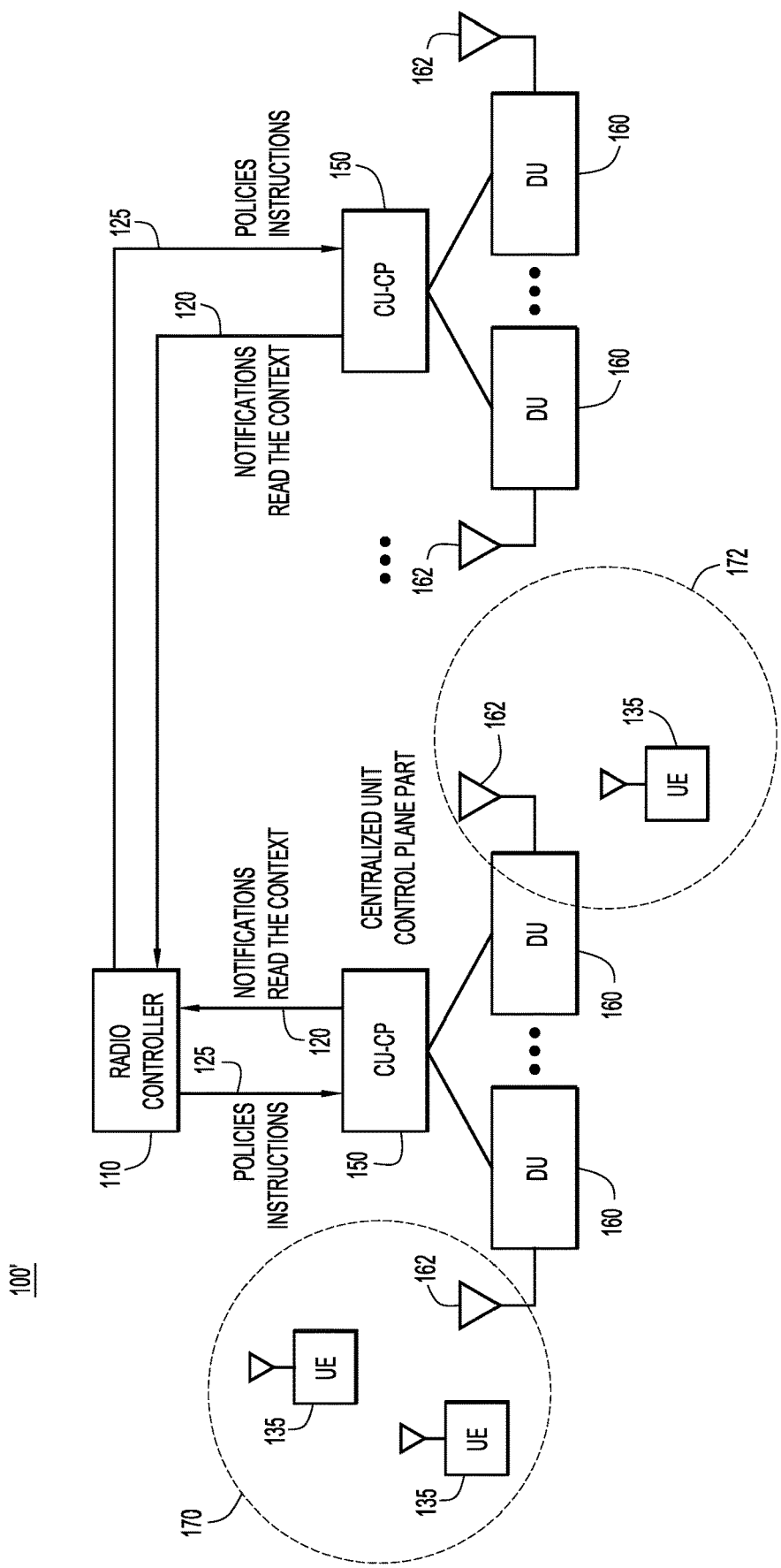
FIG. 2 is a block diagram of a system depicting an interaction between a radio controller and a centralized unit control plane part of a disaggregated base station, according to an example embodiment.

Reference is now made to FIG. 2. FIG. 2 shows a block diagram of a disaggregated base station system 100' that includes the radio controller 110, a Centralized Unit Control Plane (CU-CP) component 150 and one or more distributed units (DUs) 160. The radio controller 110 can control one or more CU-CPs 150. Each CU-CP 150 can in turn control one or more DUs 160. It should be understood that the disaggregated base station system 100' also includes a Central Unit User Plane (CU-UP) component, which is not shown in the figures because the CU-UP does not have a role in connection with the techniques presented herein.

Each DU 160 includes an antenna assembly 162 as well as the transmitter and receiver hardware to enable wireless radio frequency communication via antennas 162 with UEs 135. Each DU 160 serves wireless communication in its own cell or a DU 160 may serve multiple cells. In one example, one DU 160 serves wireless communication in a first cell 170 and another DU 160 serves wireless communication in a second cell 172.

Similar to FIG. 1, the CU-CP 150 provides notifications and contexts to the radio controller 110, at 120. The radio controller 110 provides policies and instructions based on the notifications and contexts to the CU-CP 150, at 125.

The CU-CP 150 holds the contexts for all UEs serviced by the DU(s) 160 including the states of the corresponding state machines, such as handover (HO) states of individual UE, and also the contexts associated with groups of UEs, such as status of the packet queues or load indicators. The CU-CP 150 executes policies set by the radio controller 110, such as a policy for handover decisions. The policy is understood as a set of rules, with every rule including the condition and the associated action. The condition may be expressed in terms of the context held by the radio controller 110. The events to be processed according to the policies may be changes in the contexts, e.g., arrival of the report on the radio signal measurements performed by the UE. The condition may be, for example, a threshold crossing of a signal measurement. An example of an action is triggering a handover.

The policy may include a special action of the CU-CP 150 to query the radio controller 110 for instructions. For example, for a certain category of UEs, the query can be a query for instructions whether the HO should be started and to which neighbor cell.

The radio controller 110 has read-only access to the contexts for UEs serviced by in the system 100'. The radio controller 110 sets the policies executed by the CU-CP 150, and responds to the queries generated by the CU-CP 150.

The radio controller 110 can be running Self-Optimizing Network (SON) functions, such as an Automatic Neighbor Relations, load balancing, interference mitigation etc. For example, if there is a need to steer the traffic from a first cell (e.g., cell 170) to a second cell (e.g., cell 172) for the purposes of load balancing, the radio controller 110 will take this need into account when setting the HO policy or responding to the HO related queries from a CU-CP 150.

The functional split that results in the creation of the radio controller 110 and separate CU-CP components 150 allows the radio controller 110 to make real-time decisions on certain actions to be performed on the individual UEs or the categories of UEs. These decisions include, for example:

Admitting the UE to the cell;

Admitting establishment/modification of the Radio Bearer (PDU connections, QoS Flows) towards the UE;

Executing HO on the UE;

Applying a certain multiple-input multiple-output (MIMO) transmission mode to the UE; and Associating the UE with a certain network slice instance.

The radio controller 110, CU-CP 150 and DUs 160 can be separate products and from different vendors. In such a scenario, procedures of communication between the component and its peer would described in the specifications supplied by the vendor.

In one variation of the embodiments presented herein, the radio controller 110 may control BSs of different architectures, such as one or more disaggregated BSs as shown in FIG. 2 and one or more monolithic BSs as shown in FIG. 1.

The communication between the radio controller 110 and the BS(s) 115 in FIG. 1, and between the radio controller 110 and the CU-CP(s) 150 in FIG. 2 may be by way of a software Application Programming Interface (API) in the situation where the CU-CP 150 and the radio controller 110 run on the same computing platform, or by way of a wired network or some other suitable communication interface.

Figure 3:
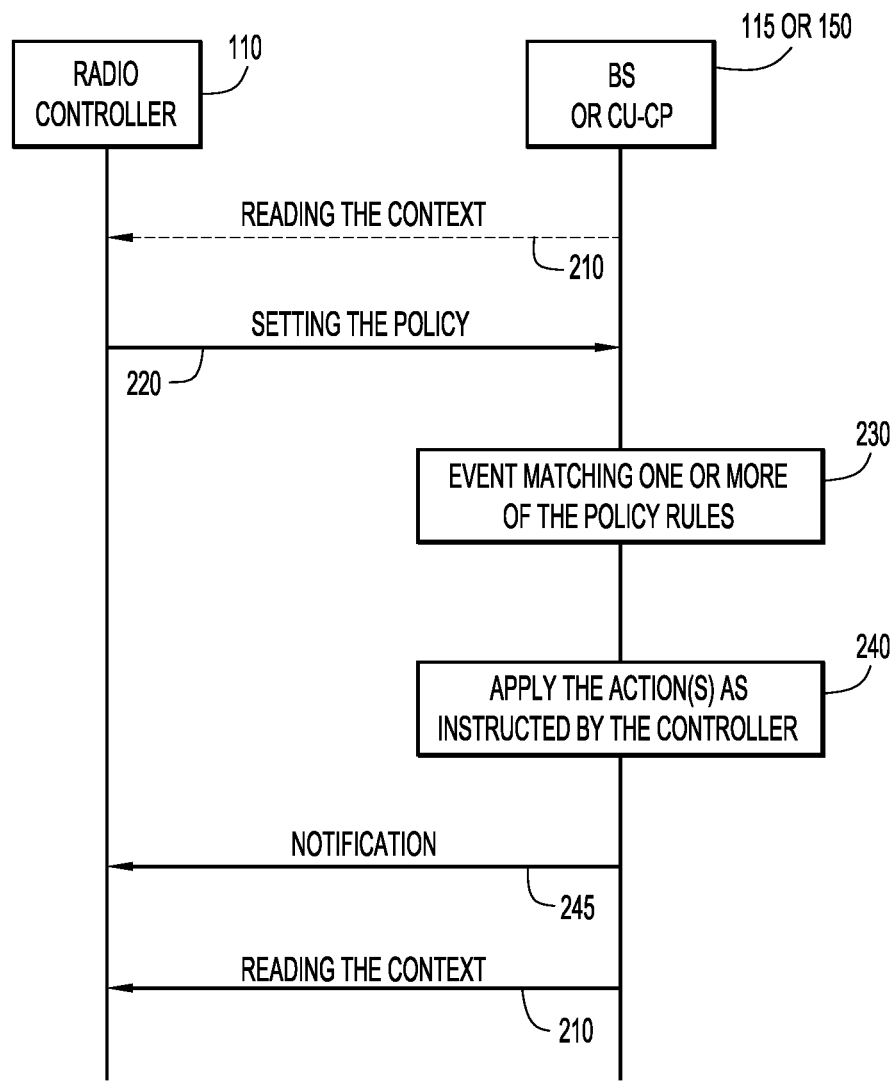
FIG. 3 is a message sequence diagram between the radio controller and a subordinated base station or centralized unit control plane part of a disaggregated base station, according to one example embodiment.

Reference is now made to FIG. 3. FIG. 3 shows a process 200 for setting and execution of a policy. As shown in FIG. 3, as part of the process 200, the radio controller 110 is interacting with either a monolithic BS 115 (FIG. 1) or multiple monolithic BSs 115, or with a CU-CP 150 or multiple CU-CPs 150. At 210, the radio controller 110 may read the context from the CU-CP 150, and in particular the radio controller 110 obtains from the CU-CP 150 information that belongs to the relevant context. At 220, the radio controller 110 sets the policy at the CU-CP 150. The radio controller 110 reads the context information from the CU-CP 150 when needed, and it need not happen before the policy is set and furthermore the context does not necessarily impact the policy to be set. For example, is quite possible to read the context after the action is executed.

A policy consists of rules. A rule consists of:

Condition: if ( . . . )

Action: do . . . .

At 230, the CU-CP 150 executes the policy in reaction to a certain event, such as context change, that matches one of the policy rules. The reaction includes selection of the applicable rule(s), per the Conditions of the matching policy rule. At 240, the corresponding Action(s) are applied for the matching policy rule(s). At 245, the CU-CP 150 sends a notification to the radio controller 110 indicating the Action(s) has/have been applied. As shown in FIG. 3, the radio controller 110 may again read the context from the CU-CP 150 as shown at 210.

The following is an example for the process 200 shown in FIG. 3.

| | |
|---|---|
| Context | The information stored in the CU-CP relates to the following: Identity of certain UE. Radio signal measurements performed by the base station (on the uplink) and reports received by the base station from the UE on the measurements of the radio signals from all base stations in the area. Planned Quality of Service (QoS) for the services provided to the UE. Overall cell information e.g. utilization of the radio resources, interference level, etc. |
| Policy for triggering the HO | Consists of several rules: Rule 1. Condition = "the level of the signal from the neighbor base station > the level of the signal from this base station + 1 dB"; Action = Trigger the handover to the neighbor base station Rule 2. Condition = "the level of the signal from the neighbor base station > the level of the signal from this base station" AND "the level of the signal from the neighbor base station <= the level of the signal from this base station + 1 dB" Action = Query the Radio Controller (Rule 2 is not invoked in this example, but is provided here for completeness.) |
| Event | The CU-CP detected that the levels of the signals reported by certain UE match the condition in the Rule 1. |

| | |
|---|---|
| The Action applied by the BS | Trigger HO to the neighbor base station. |
| Notification | The CU-CP reports to the Radio Controller that the HO has been triggered. |

Figure 4:
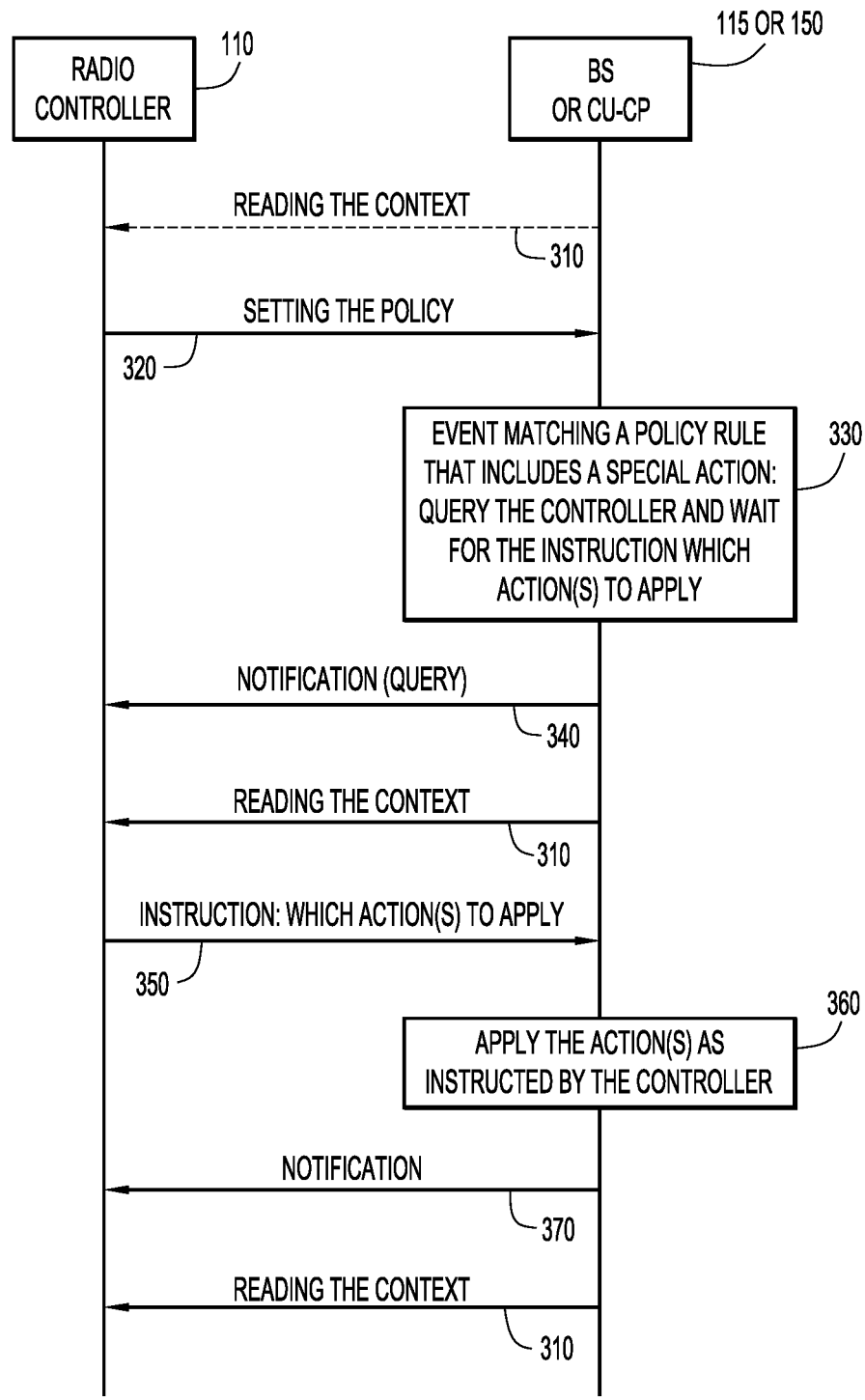
FIG. 4 is a message sequence diagram between the radio controller and a subordinated base station or centralized unit control plane part of a disaggregated base station, according to another example embodiment.

Reference is now made to FIG. 4. FIG. 4 shows a sequence diagram for a process 300 that involves activation of a special type of policy rule and querying the radio controller 110 as to which action(s) should be applied. Operations 310 and 320 are similar to operations 210 and 220 in FIG. 2. Again, operation 310 for reading the context may be performed at any time, and need not happen before setting the policy at 320. At 330, the CU-CP 150 determines whether occurrence of an event matches a policy rule that includes a special Action which involves querying the radio controller 110 and waiting for an instruction from the radio controller as to what Action(s) to apply. At 340, the CU-CP 150 sends a notification/query to the radio controller 110 about the event determined to match a policy, and requesting an instruction as to what Action(s) to apply. At 350, the radio controller 110 responds with an instruction that specifies which Action(s) the CU-CP 150 should apply. At 360, the CU-CP 150 applies the Action(s) as instructed by the radio controller 110. At 370, the CU-CP 150 sends a notification to the radio controller 110 indicating that the Action(s) have been applied.

The following is an example scenario for the process 300.

The condition may also include parameters that are set by the radio controller, such as radio signal thresholds. The interface may allow for modification of the parameters by the controller, without changing the structure of the policy. Some of parameters may be derived from the past statistics or other results of analytics (software) such as Machine Learning analytics.

Further examples of actions may include:

Modifying the Operations, Administration and Management (OAM) parameters (some OAM parameters can be changed by the base station after they are set by the management system, such as the list of neighbor base stations);

Modifying the internal (non-OAM) base station parameters that control the behavior of the base station (e.g., scheduling parameters, admission control parameters, etc.);

Triggering UE transition to the IDLE/INACTIVE state;

Triggering certain procedures by sending the corresponding messages over the base station signaling interfaces (e.g., S1, X2, NG, Xn) or base station management interfaces;

Triggering certain measurement procedures (e.g. trace type procedures in the base station and/or in the UE or a group/category of the UEs);

| | |
|---|---|
| Context | The information stored in the CU-CP relates to the following:<br>Identity of certain UE.<br>Radio signal measurements performed by the base station (in the uplink) and reports received by the base station from the UE on the measurements of the radio signals from all base stations in the area.<br>Planned QoS for the data services provided to the UE.<br>Overall cell information e.g. utilization of the Radio resources, interference level, etc. |
| Policy for triggering the HO | Consists of several rules:<br>Rule 1.<br>Condition = "the level of the signal from the neighbor base station > the level of the signal from this base station + 1 dB";<br>Action = Trigger the handover to the neighbor base station<br>Rule 2.<br>Condition = "the level of the signal from the neighbor base station > the level of the signal from this base station" AND "the level of the signal from the neighbor base station <= the level of the signal from this base station + 1 dB"<br>Action = Query the Radio Controller |
| Event | The CU-CP detected that the signal levels of the signals reported by certain UE match the condition in the Rule 2. |
| Notification (query) | A message sent to the Radio Controller when above event happened |
| Instruction | Do nothing. (The reason may be that this base station is less loaded than the neighbor base station.) |
| Notification | Report to the Radio Controller that the HO was not triggered. |

Further examples of conditions include:

Category of the UE e.g. "UE is IoT" or "UE is not IoT" (IoT=Internet of Things);

UE location e.g., "UE is located within the rectangle (cell, Tracking Area, etc.)";

UE speed/velocity e.g. "the UE speed is less than [some threshold]";

Network slice (instance) to which the UE belongs e.g., "the UE belongs to the Network Slice Instance (NSI) of the Type N" or "the UE belongs to the NSI with ID=K"; and Measurements/statistics performed by the base station e.g., load (single value or historical series) in certain cells served by the base station.

Turning on/off one of cells served by the base station (e.g., for power saving); and Adding/modifying/deleting one or more of the cells (with or without invocation of beamforming control).

Reference is now made to FIG. 5. FIG. 5 shows a flow chart of a method 400 according to an example embodiment. The method 400 is performed by a radio controller entity (e.g., radio controller 110 shown in FIGS. 1-4) that is in communication with a centralized control plane entity of a disaggregated base station, or with a monolithic base station, the disaggregated base station or the monolithic base station serving wireless user equipment in a wireless network. At 410, the radio controller entity obtains (reads) from the centralized control plane entity or from the monolithic base station, a context associated with one or more user equipment served by the disaggregated base station or the monolithic base station. As explained above, the radio controller may read the context at any time. At 420, the radio controller entity determines a policy to be set, the policy defining a set of one or more rules, each rule including a condition and an action. At 430, the radio controller provides (sends) the policy to the centralized control plane entity or to the monolithic base station. The radio controller entity may obtain (receive) from the centralized control plane entity or from the monolithic base station a notification of one or more applied actions.

As explained above, the policy enables the centralized control plane entity or the monolithic base station to match an event associated with changes in contexts, to one or more of the rules of the policy, and apply the action of a rule for which an event is determined to match. Moreover, the condition of each rule may be in terms of the context read from the centralized control plane entity or the monolithic base station.

In one form, the policy includes a particular rule that includes a special action that causes the centralized control plane entity or the monolithic base station to provide to the radio controller entity a query for an instruction as to which action(s) to apply. The method 400 then further includes: providing (sending) to the centralized control plane entity or the monolithic base station an instruction that specifies which action(s) the centralized control plane entity or the monolithic base station is to apply; and obtaining (receiving) a notification indicating that the action(s) has/have been applied.

Many examples of contexts are provided herein, including, without limitation, one or more of: identity of a particular user equipment, radio signal measurements made on an uplink, radio signal measurements obtained from reports received from a user equipment on signals received from one or more base stations, quality of service for data services provided to the user equipment, state of the user equipment, and cell information.

Similarly, many examples of an action are provided herein, including, without limitation, one or more of: changing a configuration of the centralized control plane entity or the monolithic base station; triggering actions towards one or more network nodes, including core network nodes, in communication with the radio controller entity; admitting a user equipment for service in a cell; admitting establishment or modification of a radio bearer towards a user equipment; executing handover for a user equipment; applying a particular transmission mode to a user equipment; and associating a user equipment with a particular network slice instance.

As described above, the radio controller entity may be in communication with and control of one or more disaggregated base stations and one or more monolithic base stations. In this case, the obtaining a context operation 410, the determining a policy operation 420 and the providing the policy operation 430, are performed with respect to each of the one or more disaggregated base stations and the one or more monolithic base stations.

In summary, a system and method are provided in which a radio controller entity is capable of setting the policies to be executed by a centralized control plane entity of a disaggregated base station or of a monolithic base station. A special action can be defined in a policy rule, which is to query the radio controller for instructions, such as the instructions which action(s) should be executed e.g. whether the handover should be started and to which neighbor cell. The query (policy action) can be triggered, for example, by changes in the context associated with the UE, such as reception of the signal measurement report from the UE. These techniques allow the radio controller to make real-time decisions on certain actions to be performed on the cells, individual UEs or the categories of UEs.

Figure 6:
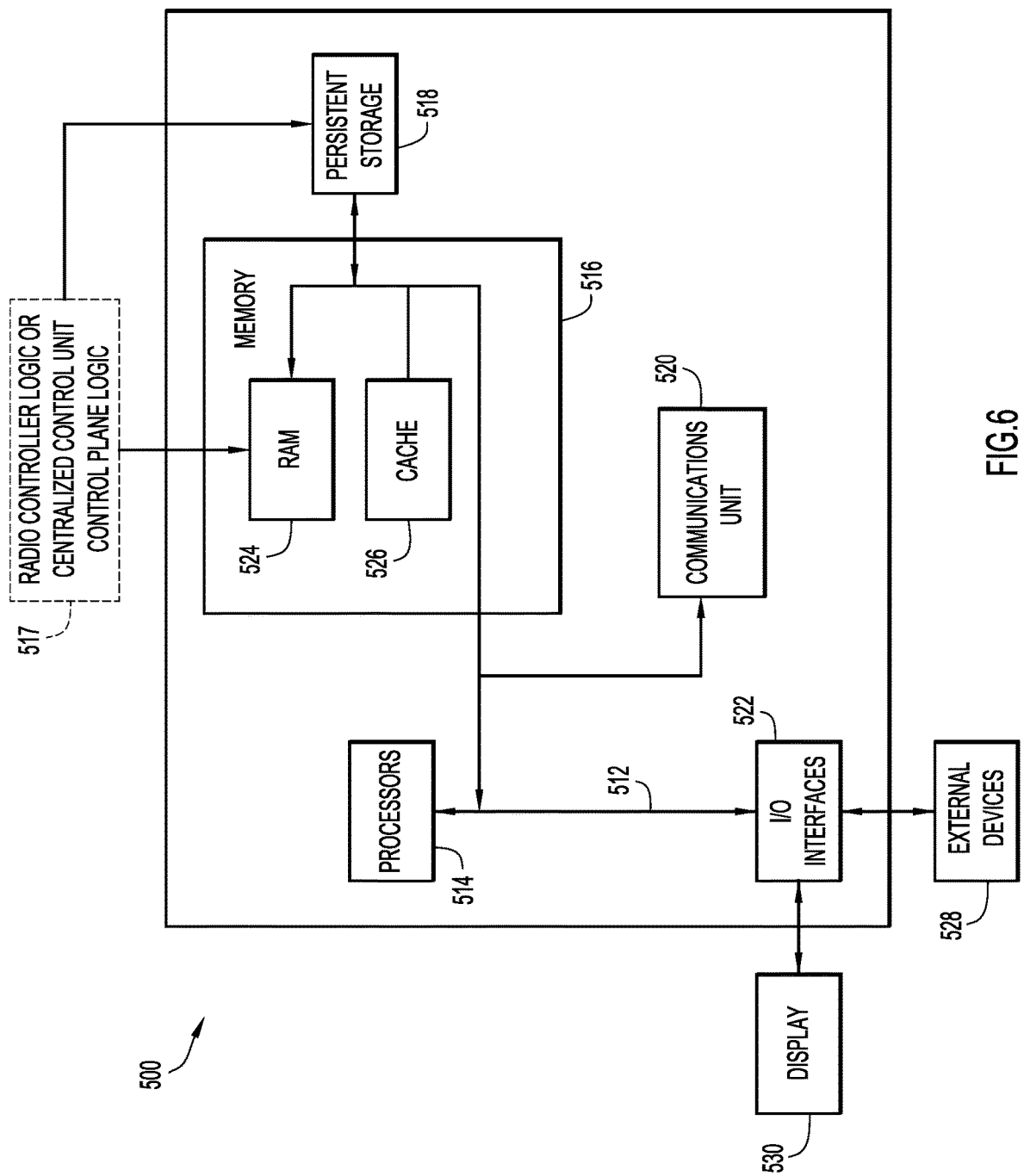
FIG. 6 is a hardware block diagram of a computing device that may perform functions of the radio controller or centralized unit control plane part, in connection with the techniques depicted in FIGS. 1-5.

FIG. 6 illustrates a hardware block diagram of a computing device 500 that may perform the functions of any of the radio controller 110 or the CU-CP 150, referred to herein in connection with FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the radio controller logic or centralized control unit control plane logic 517 may be stored in memory 516 or persistent memory 518 for execution by processor(s) 514. When the processor(s) 514 execute the radio controller logic, the processor(s) 514 are caused to perform the radio controller operations described above in connection with FIGS. 1-5. When the processor(s) 514 execute the CU-CP logic, the processor(s) 514 are caused to perform the CU-CP operations described above in connection with FIGS. 1-5.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided including, at a radio controller entity that is in communication with a centralized control plane entity of a disaggregated base station, or with a monolithic base station, the disaggregated base station or the monolithic base station serving wireless user equipment in a wireless network: obtaining from the centralized control plane entity or from the monolithic base station, a context associated with one or more user equipment served by the disaggregated base station or the monolithic base station; determining a policy to be set, the policy defining a set of one or more rules, each rule including a condition and an action; and providing the policy to the centralized control plane entity or to the monolithic base station.

In another form, a system is provided comprising: a monolithic base station or a disaggregated base station having a centralized control plane entity, the disaggregated base station or the monolithic base station serving wireless user equipment in a wireless network; and a radio controller entity in communication with the monolithic base station or the disaggregated base station, wherein the radio controller entity is configured to: obtain from the centralized control plane entity or from the monolithic base station, a context associated with one or more user equipment served by the disaggregated base station or the monolithic base station; determine a policy to be set, the policy defining a set of one or more rules, each rule including a condition and an action; and provide the policy to the centralized plane entity or to the monolithic base station.

In still another form, an apparatus is provided comprising: a communication interface configured to enable network communications with a centralized control plane entity of a disaggregated base station, or with a monolithic base station, the disaggregated base station or the monolithic base station serving wireless user equipment in a wireless network; and a processor coupled to the communication interface, wherein the processor is configured to: obtain from the centralized control plane entity or from the monolithic base station, a context associated with one or more user equipment served by the disaggregated base station or the monolithic base station; determine a policy to be set, the policy defining a set of one or more rules, each rule including a condition and an action; and provide the policy to the centralized control plane entity or to the monolithic base station.

Furthermore, in yet another form, one or more non-transitory computer readable storage media are provided that are encoded with instructions which, when executed by a processor of a radio controller entity cause the processor to perform operations including: obtaining from a centralized control plane entity or from a monolithic base station, a context associated with one or more user equipment served by the disaggregated base station or the monolithic base station; determining a policy to be set, the policy defining a set of one or more rules, each rule including a condition and an action; and providing the policy to the centralized control plane entity or to the monolithic base station.

In still another form, a method is provided that is performed by a centralized control plane entity of a disaggregated base station, or by a monolithic base station, the disaggregated base station or the monolithic base station serving wireless user equipment in a wireless network, the method including: obtaining a request from a radio controller entity to provide a context associated with one or more user equipment served by the disaggregated base station or the monolithic base station; providing to the radio controller entity the context for the one or more user equipment; obtaining a policy from the radio controller entity, the policy defining a set of one or more rules, each rule including a condition and an action; and matching one or more of the policy rules to an event associated with the one or more user equipment. The method may further include applying an action for the event based on one or more matching policy rules. Further, the method may further include providing a notification of the one or more applied actions to the radio controller entity. Further still, in another variation, the policy may include a particular rule that includes a special action that causes the centralized control plane entity or the monolithic base station to provide to the radio controller entity a query for an instruction as to which action(s) to apply, and the centralized control plane entity or the monolithic base station obtains from the radio controller entity an instruction that specifies which action(s) the centralized control plane entity or the monolithic base station is to apply; and provides to the radio controller entity a notification an indication the action(s) has/have been applied.

In still another form, an apparatus is provided including: a communication interface configured to enable network communications with a radio controller entity; and a processor configured to: obtain a request from the radio controller entity to provide a context associated with one or more user equipment served by a disaggregated base station or a monolithic base station; provide to the radio controller entity the context for the one or more user equipment; obtain a policy from the radio controller entity, the policy defining a set of one or more rules, each rule including a condition and an action; and match one or more of the policy rules to an event associated with the one or more user equipment.

In still another form, a system is provided that includes a radio controller entity; and a monolithic base station or a disaggregated base station having a centralized control plane entity, the disaggregated base station or the monolithic base station serving wireless user equipment in a wireless network, wherein the monolithic base station or the centralized control plane entity are configured to: obtain a request from the radio controller entity to provide a context associated with one or more user equipment served by a disaggregated base station or a monolithic base station; provide to the radio controller entity the context for the one or more user equipment; obtain a policy from the radio controller entity, the policy defining a set of one or more rules, each rule including a condition and an action; and match one or more of the policy rules to an event associated with the one or more user equipment.

Further still, one or more non-transitory computer readable storage media are provided, encoded with instructions that when executed by a processor of a monolithic base station or a disaggregated base station having a centralized control plane entity, the disaggregated base station or the monolithic base station serving wireless user equipment in a wireless network, the instructions causing the processor to perform operations including: obtaining a request from a radio controller entity to provide a context associated with one or more user equipment served by the disaggregated base station or the monolithic base station; providing to the radio controller entity the context for the one or more user equipment; obtaining a policy from the radio controller entity, the policy defining a set of one or more rules, each rule including a condition and an action; and matching one or more of the policy rules to an event associated with the one or more user equipment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a radio controller entity that is in communication with a centralized control plane entity of a disaggregated base station, or with a monolithic base station, the disaggregated base station or the monolithic base station serving wireless user equipment in a wireless network:
   obtaining from the centralized control plane entity or from the monolithic base station, a context associated with one or more user equipment served by the disaggregated base station or the monolithic base station, wherein the disaggregated base station serves one or more user equipment via one or more distributed units that communicate wirelessly with the one or more user equipment, and wherein the centralized control plane entity holds contexts for the one or more user equipment served in wireless communication with the one or more distributed units;
   determining a policy to be set, the policy defining a set of one or more rules, each rule including a condition and an action; and
   providing the policy to the centralized control plane entity or to the monolithic base station.

2. The method of claim 1, wherein the policy enables the centralized control plane entity or the monolithic base station to match an event associated with changes in contexts, to one or more of the rules of the policy, and apply the action of a rule for which an event is determined to match, and further comprising:
   obtaining from the centralized control plane entity or from the monolithic base station, a notification of one or more applied actions.

3. The method of claim 1, wherein the condition of each rule is in terms of the context read from the centralized control plane entity or the monolithic base station.

4. The method of claim 1, wherein the policy includes a particular rule that includes a special action that causes the centralized control plane entity or the monolithic base station to provide to the radio controller entity a query for an instruction as to which action(s) to apply, and further comprising:
   providing to the centralized control plane entity or the monolithic base station an instruction that specifies which action(s) the centralized control plane entity or the monolithic base station is to apply; and
   obtaining a notification indicating the action(s) has/have been applied.

5. The method of claim 1, wherein the context includes one or more of: identity of a particular user equipment, radio signal measurements made on an uplink, radio signal measurements obtained from reports received from a user equipment on signals received from one or more base stations, quality of service for data services provided to the user equipment, state of the user equipment, and cell information.

6. The method of claim 1, wherein the action includes one or more of: changing a configuration of the centralized control plane entity or the monolithic base station; triggering actions towards one or more network nodes, including core network nodes, in communication with the radio controller entity; admitting a user equipment for service in a cell; admitting establishment or modification of a radio bearer towards a user equipment; executing handover for a user equipment; applying a particular transmission mode to a user equipment; and associating a user equipment with a particular network slice instance.

7. The method of claim 1, wherein the radio controller entity is in communication with and control of one or more disaggregated base stations and one or more monolithic base stations, and wherein the obtaining a context, determining a policy and providing the policy are performed with respect to each of the one or more disaggregated base stations and the one or more monolithic base stations.

8. A system comprising:
   a monolithic base station or a disaggregated base station having a centralized control plane entity, the disaggregated base station or the monolithic base station serving wireless user equipment in a wireless network; and
   a radio controller entity in communication with the monolithic base station or the disaggregated base station, wherein the radio controller entity is configured to:
   obtain from the centralized control plane entity or from the monolithic base station, a context associated with one or more user equipment served by the disaggregated base station or the monolithic base station, wherein the disaggregated base station serves one or more user equipment via one or more distributed units that communicate wirelessly with the one or more user equipment, and wherein the centralized control plane entity holds contexts for the one or more user equipment served in wireless communication with the one or more distributed units;
   determine a policy to be set, the policy defining a set of one or more rules, each rule including a condition and an action; and
   provide the policy to the centralized control plane entity or to the monolithic base station.

9. The system of claim 8, wherein the policy enables the centralized control plane entity or the monolithic base station to match an event associated with changes in contexts, to one or more of the rules of the policy, and apply the action of a rule for which an event is determined to match.

10. The system of claim 9, wherein the radio controller entity is configured to obtain from the centralized control plane entity or from the monolithic base station, a notification of one or more applied actions.

11. The system of claim 8, wherein the policy includes a particular rule that includes a special action that causes the centralized control plane entity or the monolithic base station to provide to the radio controller entity a query for an instruction as to which action(s) to apply, and wherein the radio controller entity is configured to:
   provide to the centralized control plane entity or the monolithic base station an instruction that specifies which action(s) the centralized control plane entity or the monolithic base station is to apply; and
   obtain a notification indicating the action(s) has/have been applied.

12. The system of claim 8, wherein the context includes one or more of: identity of a particular user equipment, radio signal measurements made on an uplink, radio signal measurements obtained from reports received from a user equipment on signals received from one or more base stations, quality of service for data services provided to a user equipment, state of the user equipment, and cell information.

13. The system of claim 8, wherein the action includes one or more of: changing a configuration of the centralized control plane entity or the monolithic base station; triggering actions towards one or more network nodes, including core network nodes, in communication with the radio controller entity; admitting a user equipment for service in a cell; admitting establishment or modification of a radio bearer towards a user equipment; executing handover for a user equipment; applying a particular transmission mode to a user equipment; and associating a user equipment with a particular network slice instance.

14. The system of claim 8, and comprising one or more disaggregated base stations and one or more monolithic base stations that are in communication with the radio controller entity, and wherein the radio controller entity is configured to obtain a context, determine a policy and provide the policy with respect to each of the one or more disaggregated base stations and the one or more monolithic base stations.

15. An apparatus comprising:
a communication interface configured to enable network communications with a centralized control plane entity of a disaggregated base station, or with a monolithic base station, the disaggregated base station or the monolithic base station serving wireless user equipment in a wireless network; and
a processor coupled to the communication interface, wherein the processor is configured to:
obtain from the centralized control plane entity or from the monolithic base station, a context associated with one or more user equipment served by the disaggregated base station or the monolithic base station, wherein the disaggregated base station serves one or more user equipment via one or more distributed units that communicate wirelessly with the one or more user equipment, and wherein the centralized control plane entity holds contexts for the one or more user equipment served in wireless communication with the one or more distributed units;
determine a policy to be set, the policy defining a set of one or more rules, each rule including a condition and an action; and
provide the policy to the centralized control plane entity or to the monolithic base station.

16. The apparatus of claim 15, wherein the policy enables the centralized control plane entity or the monolithic base station to match an event associated with changes in contexts, to one or more of the rules of the policy, and apply the action of a rule for which an event is determined to match.

17. The apparatus of claim 15, wherein the policy includes a particular rule that includes a special action that causes the centralized control plane entity or the monolithic base station to provide to the apparatus a query for an instruction as to which action(s) to apply, and wherein the processor is further configured to:
provide to the centralized control plane entity or the monolithic base station an instruction that specifies which action(s) the centralized control plane entity or the monolithic base station is to apply; and
obtain a notification indicating that the action(s) has/have been applied.

18. The apparatus of claim 15, wherein the context includes one or more of:
identity of a particular user equipment, radio signal measurements made on an uplink, radio signal measurements obtained from reports received from a user equipment on signals received from one or more base stations, quality of service for data services provided to a user equipment, state of the user equipment, and cell information.

19. The apparatus of claim 15, wherein the action includes one or more of: changing a configuration of the centralized control plane entity or the monolithic base station; triggering actions towards one or more network nodes, including core network nodes, in communication with the apparatus; admitting a user equipment for service in a cell; admitting establishment or modification of a radio bearer towards a user equipment; executing handover for a user equipment; applying a particular transmission mode to a user equipment; and associating a user equipment with a particular network slice instance.

20. The apparatus of claim 15, wherein the communication interface is in communication with one or more disaggregated base stations and one or more monolithic base stations, and wherein the processor is configured to obtain a context, determine a policy and provide the policy, with respect to each of the one or more disaggregated base stations and the one or more monolithic base stations.

* * * * *